United States Patent [19]

Ray

[11] 4,367,717
[45] Jan. 11, 1983

[54] FUEL TREATING APPARATUS FOR ENGINES

[75] Inventor: Dennis A. Ray, Crookston, Minn.

[73] Assignee: Northwest Investments, Crookston, Minn.

[21] Appl. No.: 138,218

[22] Filed: Apr. 7, 1980

[51] Int. Cl.³ .......................................... F02M 31/00
[52] U.S. Cl. .................................. 123/557; 123/552; 165/51
[58] Field of Search ............... 123/545, 557, 552, 558; 165/51, 52

[56] References Cited

U.S. PATENT DOCUMENTS

| | | | |
|---|---|---|---|
| 1,318,068 | 10/1919 | Giesler | 123/557 |
| 2,896,658 | 7/1959 | Jones | 165/52 |
| 2,988,075 | 6/1961 | Ensign | 123/557 |
| 3,762,385 | 10/1973 | Hollnagel | 123/545 |
| 3,841,284 | 10/1974 | Krygowski | 123/545 |
| 4,083,340 | 4/1978 | Furr | 123/557 |

Primary Examiner—Ronald H. Lazarus
Attorney, Agent, or Firm—H. Dale Palmatier

[57] ABSTRACT

Gasoline treating apparatus for an automotive engine including a modulating heat exchanger heating the gasoline from the supply tank before directing the gasoline into the carburetor and utilizing heat from the engine coolant, the temperature of the heated gasoline being sensed for regulating the flow of the engine coolant; and an additional heater for the gasoline in the air-fuel mixture and obtaining heat for the additional heating from the engine coolant.

11 Claims, 5 Drawing Figures

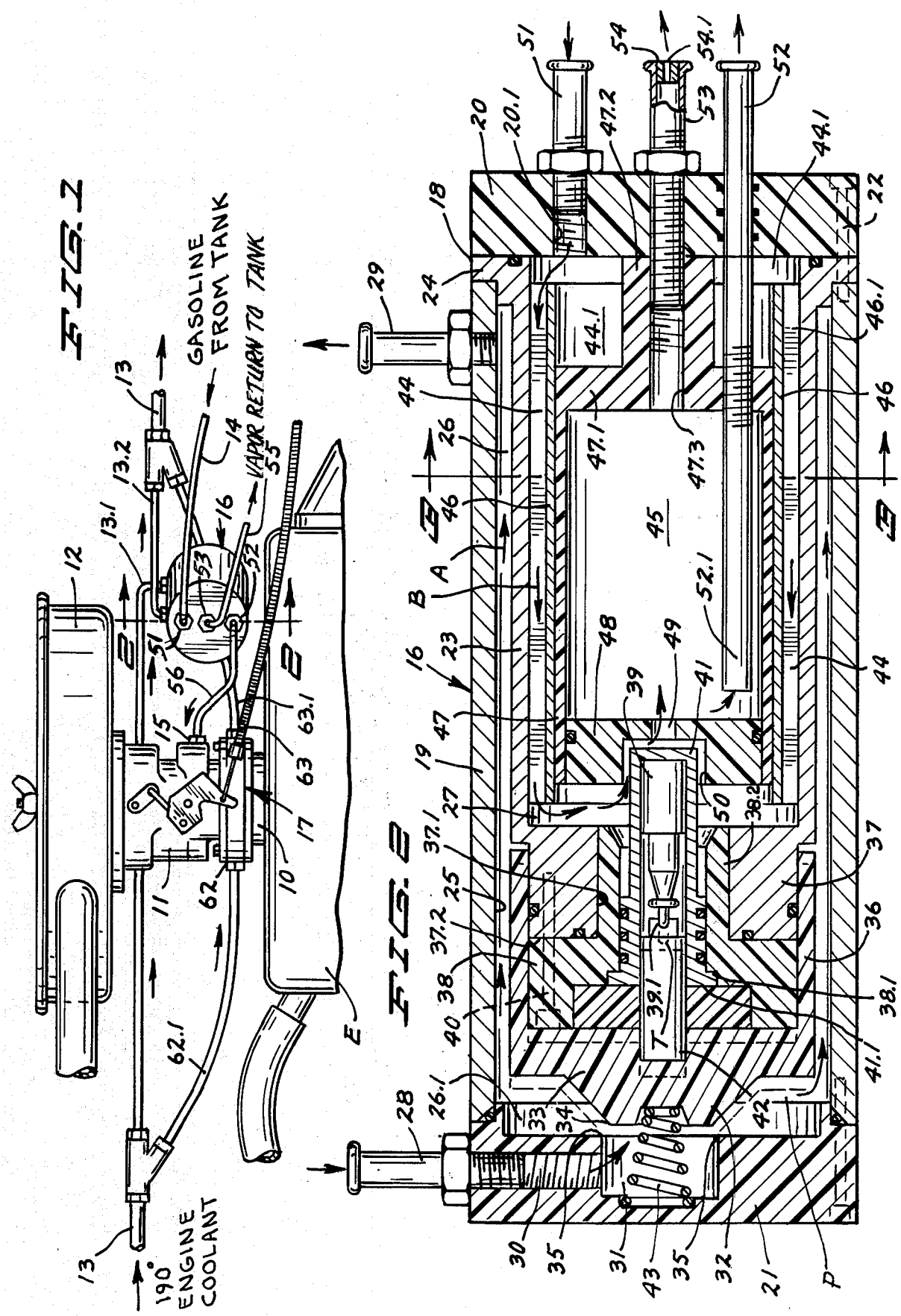

FUEL TREATING APPARATUS FOR ENGINES

This invention relates to apparatus for heating gasoline prior to supplying the gasoline to the carburetor of an engine, and also heating the air-fuel mixture flowing from the carburetor to the inlet manifold of the engine.

BACKGROUND OF THE INVENTION

In the prior art, there have been a number of devices for the purpose of attempting to vaporize the gasoline flowing from the carburetor to the intake manifold of an automotive type engine by supplying heat to the air-fuel mixture. Vaporizing of the gasoline in the air-fuel mixture has accomplished more efficient use of the gasoline and allows less consumption of gasoline for engine operation. In an automotive type engine, the miles of travel of the automobile per gallon of gasoline used has been significantly increased under certain conditions.

It has been found that, whereas a vaporizing device attached to the carburetor may cause substantially complete vaporization of the gasoline in the air-fuel mixture during mild summertime weather conditions, the vaporization of the gasoline becomes considerably less complete in such apparatus in frigid wintertime temperatures that may drop to −20° F., or lower.

SUMMARY OF THE INVENTION

An object of the invention is to provide apparatus for treating the gasoline used in an automotive type engine so that the engine will make more efficient use of the gasoline supply.

Another object of the invention is to treat the gasoline used to operate an automotive type engine to increase the efficiency of use of the gasoline and to compensate for varying temperature conditions and weather conditions which affect the gasoline supplied to the engine.

Another object of the invention is to preheat the gasoline flowing from the storage tank to the carburetor of an engine so as to maintain a substantially constant and substantially boiling temperature for the gasoline as it enters the carburetor in order to facilitate complete varporization of the gasoline in order to provide more efficient utilization of the gasoline in the engine.

A feature of the present invention is the provision of a heat exchange canister in which the gasoline is heated as it flows from the storage tank to the carburetor, and obtain the necessary heat from the fluid used to cool the engine.

Another feature of the invention is to closely regulate the amount of heat supplied to the gasoline in the heat exchange canister so as to continuously supply the gasoline to the carburetor at a predetermined temperature in order to allow substantially complete vaporization of the gasoline in the air-fuel mixture, regardless of the ambient temperature and weather conditions.

Another feature of the invention is the construction of a canister heat exchanger which vents small quantities of the heated gasoline back to the tank to prevent vapor lock, and also utilizes the hottest portion of the engine cooling fluid to produce the final heating of the gasoline being heated in order to maximize and carefully control the heating of the gasoline in the heat exchanger.

Another feature of the invention is the utilization of a heater for the gasoline being supplied to the carburetor and an additional heater for adding further quantities of heat to the gasoline contained in the air-fuel mixture flowing from the carburetor to the intake manifold and thereby carefully regulating the gasoline temperature entirely as it moves through the carburetor so as to assure substantially complete vaporization of the gasoline regardless of ambient temperatures and severe weather conditions.

A principal advantage of the present invention is the obtaining of more efficient utilization of the gasoline supplied to an automotive type engine so as to obtain more work output from the engine per quantity of gasoline consumed by the engine, or to obtain more miles of travel of a vehicle per gallon of gas consumed.

Another advantage is the obtaining of the improved efficiency of the gasoline by supplying heat to the gasoline in a careful, controlled and safe manner, which not only improves the varporization of the gasoline as it flows with the air to the intake manifold, but also actually increases the volume of the gasoline by heating the gasoline prior to entering the carburetor so that the number of gallons of gasoline supplied into the carburetor exceeds by a substantial proportion the number of gallons which were originally supplied into the storage tank.

BRIEF SUMMARY OF THE DRAWINGS

FIG. 1 is a diagrammatic illustration of the present invention applied to a gasoline engine;

FIG. 2 is an enlarged detail section view taken longitudinally through the heat exchange canister as seen at 2—2 in FIG. 3;

DETAILED SPECIFICATION

Figure 3:
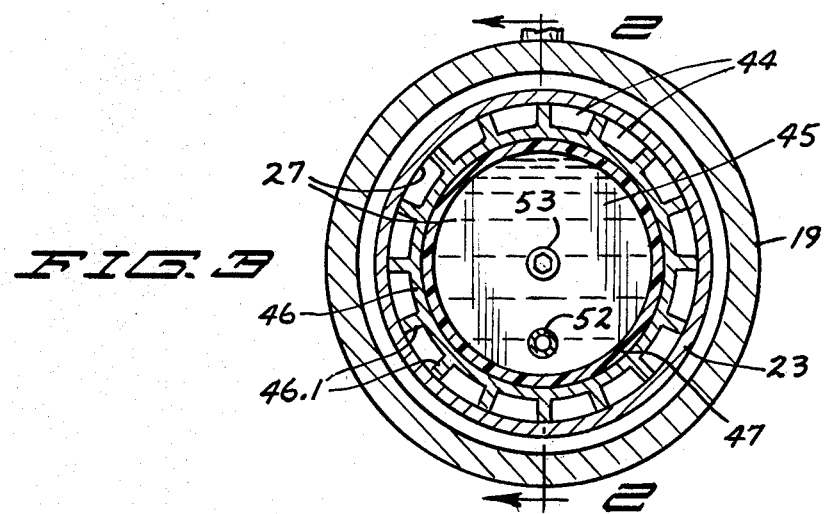
FIG. 3 is a detail section view taken approximately at 3—3 in FIG. 2.

In FIG. 1 is illustrated an automotive type gasoline engine E having an intake manifold 10 and a carburetor 11 on which the air cleaner 12 is secured. The engine E is liquid cooled and has coolant-carrying hoses 13 associated with it through which flows the 190° F. engine coolant. The hose 13 may be the typical heater hose which carries the hot coolant to the heater commonly used for supplying heat to the passenger compartment of the automobile body.

The gasoline line 14 which carries gasoline from the supply tank on the vehicle is normally connected into the carburetor at the fitting 15.

The present invention includes, as principal parts, a heater 16 producing substantial heating of the gas flowing from the tank and gasoline line 14 to the carburetor 11; and a carburetor insert 17 inserted between the base of the carburetor and the intake manifold 10 to significantly heat the air-fuel mixture flowing from the carburetor to the engine by utilizing heat from the hot engine coolant and thereby vaporizing the gasoline in the air-gasoline mixture.

The heater 16 is shown in detail in FIGS. 2 and 3 and comprises a container 18 having a peripheral wall 19 and end walls 20 and 21. The end walls are attached in sealing relation to the ends of the cylindrical outer wall 19 by screws 22.

An elongate cylindrical heat transfer wall 23 formed of aluminum or another efficient heat conducting metal has its cylindrical portion spaced inwardly from the outer peripheral wall 19, and has an annular flange 24 clamped between the adjacent end of the outer peripheral wall 19 and the adjacent end wall 20, so as to hold the cylindrical wall 23 in fixed relation to the outer wall 19. The heat transfer wall 23 divides the interior chamber 25 into an annular heating fluid chamber 26 and a central gasoline chamber 27. The heating fluid or engine coolant is supplied into and taken out of the annular chamber 26 by a pair of hose fittings 28 and 29. Fitting 29 is threaded into and through a tapped aperture for communicating with one end of the chamber 26, and fitting 28 is threaded into a transverse aperture 30 in the end wall 21 which communicates with a central recess 31 which communicates with adjacent portions 26.1 of the heating fluid chamber 26. Flow of the coolant or heating fluid through the chamber 26 is normally in the direction of arrow A.

Flow of heating fluid or engine coolant through the chamber 26 is controlled and modulated by a valve element 32 adjacent the end wall 21. The valve element 32 is generally cup-shaped and has a base portion 33 with a conically shaped valve portion 34. A valve seat 35 is formed at the inner periphery of the recess 31 in the end wall 21 to cooperate with the valve element 32 to control the flow of fluid between the recessed area 31 and the end portion 26.1 of the annular heating fluid chamber. The valve element 32 also has a cylindrical peripheral wall portion 36 embracing and slidable upon a cylindrical mounting boss 37 formed integrally with the heat transfer wall 23. The boss 37 effectively forms the end of the central gasoline chamber 27 and maintains the heating fluid in annular chamber 26 in isolation from the gasoline in the central chamber 27. The cylindrical wall 36 of the valve element 32 is slidable along the boss 37 in order to open and close the valving relationship at recess 31. It will be recognized that the valving element 36 is formed of an insulating plastic such as Teflon or nylon. The dotted line position P illustrates one additional position of the valve element which is possible as the valve element moves longitudinally to and fro during its modulating action. The valve element 32 may move entirely against the valve seat 35 to entirely prevent flow of heating fluid through the annular chamber 26, but normally flow of the heating fluid or coolant will be permitted through the chamber 26.

An insulated mounting 38 is provided for a heat sensitive thermostatically operating device 39 used to operate the valve element 32 for opening and closing the flow passage for the heating fluid in response to temperature of the gasoline in the central gasoline chamber 27. The mounting 38 has a cylindrical boss portion 39 extending and sealed in a central opening 37.1 of the boss 37. It will be recognized that the mounting 38 has transverse shoulder surfaces bearing against the transverse end face 37.2 of the metal boss 37. The mounting 38 is affixed to the boss 37 as by screws 40.

The thermostatically controlled operating element 39 is confined in a mounting cup 41 which has a mounting flange 41.1 resting upon a recessed shoulder surface 38.1 of the mounting 38.

The thermostatically controlled operating element 39 is sensitive to the surrounding temperature and has an operating rod 39.1 at its inner end which is capable of projecting outwardly of its shroud to the dotted line position T in response to sensed hotter temperatures in the chamber 27 as to move the piston or lug 42 and cause the valve element 32 to move endwise.

The thermostatically controlled operating element 39 and its projectable lug 39.1 operate against a compression spring 43 which bears against the other side of the valve element and is located in the recess 31.

It will be recognized that, as temperatures in the chamber 27 are reduced, the thermostatically controlled operating element 39 retracts its extensible lug 39.1 and the spring 43 moves the valve element away from the valve seat 35 and allows more of the heating fluid to flow through the chamber 26.

The central gasoline chamber 27 is divided into a multiplicity of longitudinal gasoline ducts 44 and an expansion chamber 45. The ducts 44 extend along the inner periphery of the heat transfer wall 23 and are defined by an aluminum cylindrical sleeve 46 formed with a multiplicity of radial fins 46.1 thereon.

The passages of 44 are separated from the expansion chamber 45 by an insulating wall 47. The wall 47 is formed of an insulating plastic type material such as Teflon or nylon, or other suitable rigid plastic material. The wall 47 is securely held by the inner periphery of the sleeve 46 and has a transverse end wall 47.1 and a tubular base 47.2 defining a central passage 47.3.

A transverse end wall 48 is affixed in the end of peripheral wall 47 and sealed therein. Wall 48 has a central inlet passage 49 communicating with a central recess 50 which surrounds the cup-shaped mounting 41 of the thermostatically controlled operating element 39. Accordingly, flow from the passages 44 passes through the peripheral portions of the recess 50 and through the opening 49 into the expansion chamber 45.

To provide for flow of gasoline through the heater, an inlet fitting 51 and an outlet fitting 52 are mounted in the end wall 20, and an additional vapor-bleeding outlet fitting 53 is also mounted in the end wall 20. It is important that the outlet fitting 52 be disposed with its inlet end 52.1 at the lowest portion of the expansion chamber 45. It will be seen that the fitting 52 is sealed into the end wall 20 and is threaded through a suitably tapped opening in the base wall 47.1 of the inner insulating wall 47.

The fitting 51 is threaded into a tapped aperture 20.1 of the end wall 20 so as to supply cold gasoline from the tank into the annular manifold space 44.1 for delivery into the flow passages 44 where the gasoline picks up heat from the heat transfer wall 23.

The fitting 53 is threaded into a tapped aperture in the end wall 20 and into the central opening 47.3 of the tubular base 47.2. It is important that the central opening 47.3 is disposed above the inlet 52.1 of the discharge fitting 52 in order that collected vapors may be discharged through the fitting 53 without interfering with the flow of liquid gasoline through the fitting 52.

The fitting 53 has an insert 54 therein defining an orifice opening 54.1 for limiting outward flow of liquid gasoline through the fitting 53, but permitting escape of any vapors that may be collected. The fitting 54 is connected as by a tube 55 back to the gasoline tank for condensing the vapors and returning the condensed gasoline to the tank.

The heated gasoline is conveyed from the fitting 52 through a tube 56, preferably insulated, into the fitting 15 of the carburetor.

Hot engine coolant is supplied to the fitting 28 by a hose 13.1 from the heater hose 13, and coolant from which heat has been extracted is conveyed from fitting 29 by a hose 13.2 back to the heater hose 13.

Figure 5:
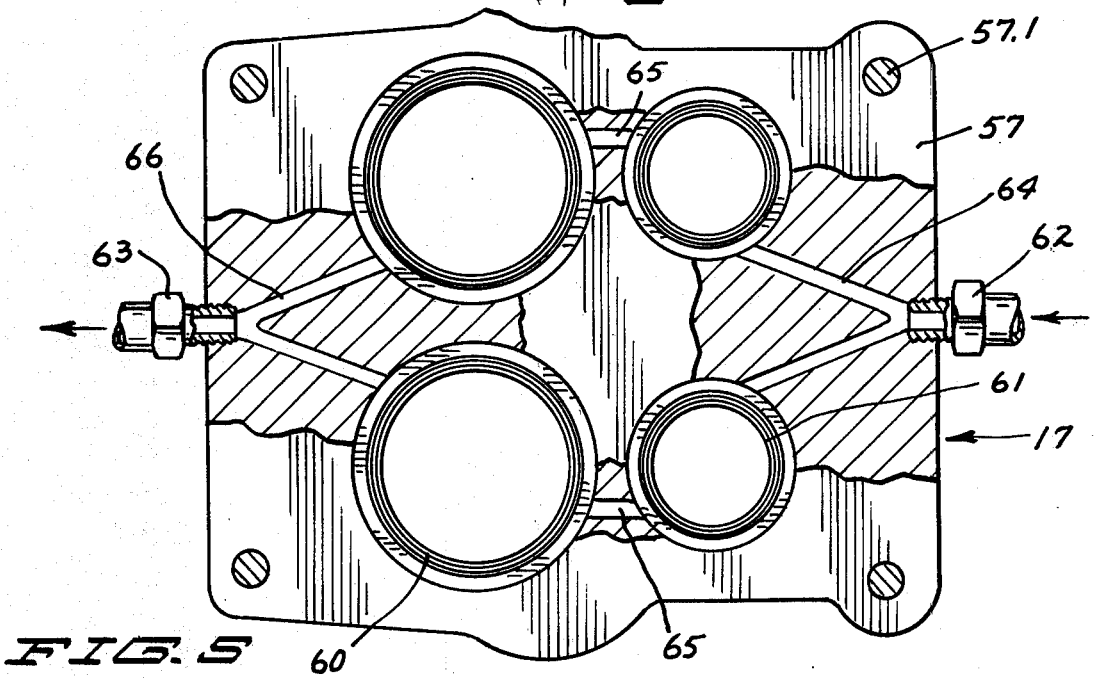
FIG. 5 is a detail section view taken approximately at 5—5 in FIG. 4 with portions broken away for clarity of detail.
Figure 4:
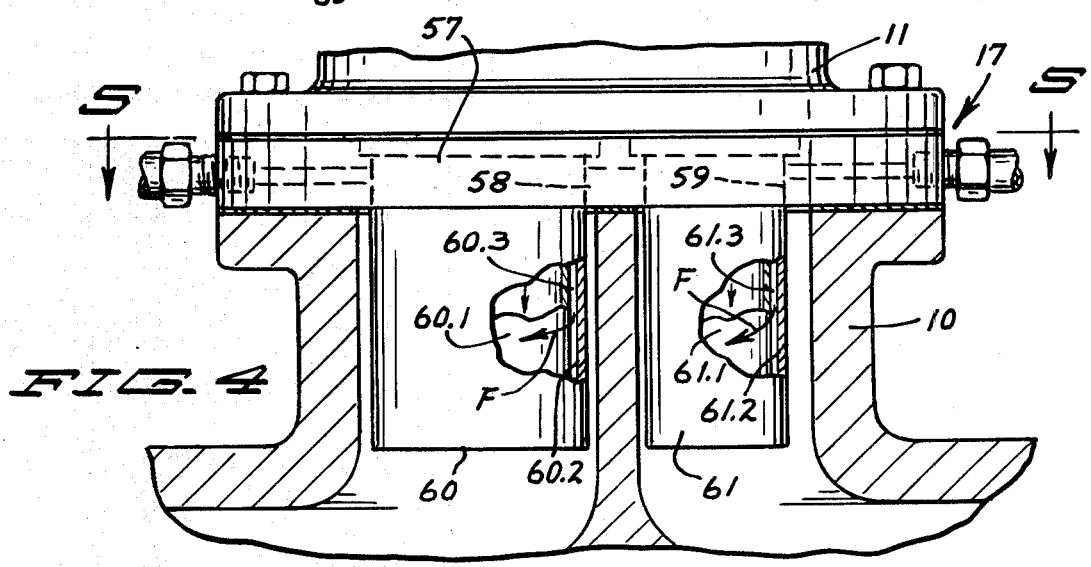
FIG. 4 is an enlarged elevation view partly broken away in section and illustrating the vaporizing attachment for the carburetor.

The insert 17 is shown in detail in FIGS. 4 and 5 and comprises a metal plate 57 with mounting holes 57.1 to provide for clamping of the plate 57 between the base of the carburetor 11 and the intake manifold 10. The plate 57 has large ports 58 and 59 therein arranged to be aligned with the fuel ports in the carburetor 11. Double walled heat exchanger cylinders 60 and 61 are suspended in the ports 58 and 59, respectively, for heating the air-fuel mixture flowing from the carburetor ports to the input manifold. The cylinders 60 and 61 extend downwardly from the plate 57 into the intake manifold to influence the air-fuel mixture during a substantial length of its flow as it enters the intake manifold.

The double walled heat exchangers 60 and 61 have inner walls 60.1 and 61.1, and outer walls 60.2 and 61.2, which define annular spaces 60.3 and 61.3 therebetween to accommodate flow of hot heating fluids in the manner indicated by arrows F. Heating fluid is supplied by the engine coolant through fittings 62 and 63 which communicate with passages 64, 65 and 66, which are respectively connected into the annular heat chambers 60.3 and 61.3 for the purpose of heating the inner walls 60.1 and 61.1, thereby significantly heating and vaporizing the gasoline in the air-fuel mixture.

As seen in FIG. 1, engine coolant is supplied to the fitting 62 by a hose 62.1 which is connected to the heater hose 13; and the engine coolant, after significant heat is extracted therefrom by the insert 17, is returned to the heater hose by tube or hose 63.1.

It has been found that the insert 17 and the heater 16 cooperate with each other to obtain substantially more efficient utilization of gasoline in an automobile engine.

The heater 16 heats the gasoline as it flows from the tank to the carburetor to approximately 100° F. which is the boiling temperature of gasoline. At this temperature, the gasoline which reaches the carburetor 11, is prepared to be vaporized by the insert 17 with the addition of small quantities of additional heat. In addition, the heating of the gasoline effected by the heater 16 causes the gasoline to expand from its cold condition as it is drawn from the supply tank of the vehicle so that a substantially increased quantity of gasoline reaches the carburetor as compared to the quantities of gasoline which are drawn from the tank. Empirical studies have shown that gasoline which is at −10° F. in the tank and is heated to approximately 100° F. as it enters the carburetor will expand by approximately two-thirds of a cup per quart of gasoline from the tank; and in other words, for twenty gallons of gasoline drawn from the tank at −10° F., approximately twenty-three gallons of gasoline is delivered to the carburetor after being heated to 100° F. By virtue of this expansion alone, substantial efficiency is obtained in relation to the gasoline purchased at the pump and delivered into the tank. Accordingly, the canister or heater 16 is useful in increasing the fuel efficiency of the vehicle, even though the heater may be simply used without the insert 17.

However, in order to obtain maximum increase in efficiency, cooperation between the heater 16 and the insert 17 is desired.

In most instances, the thermostatically controlled operating element 39 will cause the gasoline to be heated to approximately 120° F., that is to say, an element 39 is selected with thermostatic characteristics so that the valve 32 is operated to maintain the gasoline at a temperature of approximately 120° F. as it enters the carburetor. This may be varied, by selecting a different thermostatically controlled operating element 39 so as to deliver gasoline at a temperature of up to 130° F.

As the engine coolant flows through the annular heating fluid chamber 26 in the direction of arrow A, it will be recognized that the gasoline at the other side of the heat exchange wall is flowing in the opposite direction indicated by arrow B. As a result, the gasoline reaches its hottest temperature as it exits the ducts 44. As the gasoline is being heated, the gasoline expands and then the gasoline flows into the expansion chamber 45. The insulating wall 47 prevents any transfer of heat from the hot gasoline in the expansion chamber 45 to the cooler gasoline in the ducts 44. At 120° F., quantities of vapor are being formed in the gasoline and these vapors will be returned to the tank through the fitting 53 and orifice 54.1 and return pipe 55.

By the time the gasoline is heated and exits the discharge fitting 52 and travels to the carburetor at intake fitting 15, the heated gasoline will have a temperature of approximately 100° F. Because the boiling point of gasoline is approximately 100° F., the adding of even small quantities of heat by the insert 17 causes substantially complete vaporization of the gasoline in the air-fuel mixture as to materially increase the operating efficiency of the engine, obtaining more output of the engine per gallon of gasoline utilized.

It will be recognized that, although the engine coolant entering the fitting 28 is at approximately 190° F., the modulating valve 32 will control the flow of the engine coolant so that the temperature of the gasoline at the thermostatically controlled element 39 will be maintained at approximately 120° F. in most instances.

It is important to recognize that the present invention including the heater 16 and the insert 17 is effective for improving the efficiency of gasoline at all ambient temperatures from −20° F. to 90° F. Effectiveness of the apparatus for improving operating efficiency during warm weather is still somewhat better than during cold weather, but during cold weather, that is to say, in the range of 0° to 10° F., there is approximately seven miles per gallon gain in the operating capabilities of the engine; and under warm weather conditions, from 70° to 90° F., a ten to twelve miles per gallon increase in the operating of an automobile has been experienced.

Although it is necessary to maintain the inlet 52.1 of the discharge tube at the lower portion of the expansion chamber 45, the container or canister may be oriented either on its side as illustrated, or in upright position with the fittings 51, 52 and 53 disposed at the top of the canister.

If the heater 16 is operated at somewhat lower temperatures so as to stay below the boiling point of the gasoline, the return fitting 53 may be eliminated because there will be no vapor needed to be returned to the tank for condensation. When the fitting 53 is eliminated, the outlet fitting 52 may be repositioned in the end wall 20 and located centrally thereof instead of in its asymmetric location illustrated.

It will be seen that I have provided a new and improved engine attachment for improving the utilization of gasoline in the engine of a motor vehicle. The quantity of gasoline is actually stretched by expansion of the liquid gasoline and more efficient use is made of the gasoline because the gasoline is heated to the boiling point and needs only a small amount of additional heat at the carburetor in order to complete vaporization of the gasoline which is accomplished by the present invention.

What is claimed is:

1. An engine attachment for heating liquid fuel with heat from the hot engine coolant comprising
   an elongate container having an elongate annular side wall with ends upon which transverse first and second end walls are affixed,
   an elongate annular heat transfer wall affixed within the container and extending from said first transverse end wall and along and in spaced relation to the annular side wall to define a hot engine coolant flow passage therebetween and entirely surrounding the heat transfer wall,
   fuel flow guide means within the heat transfer wall and around the entire inner periphery thereof for defining restricted passage means extending from one end of the heat transfer wall to the other end thereof and causing the fuel to scrub against the heat transfer wall as the fuel progresses through the container,
   a variable flow valve in flow communication with the hot engine coolant flow passage to regulate and vary the flow of the hot engine coolant through said passage and along the heat transfer wall, the flow valve having a temperature sensitive control varying the flow opening of the valve and a temperature sensing element for the control and in flow communication with the fuel inwardly of the heat transfer wall,
   a fuel inlet fitting on the container adjacent the first end wall and directing the fuel into said passage means,
   a hot engine coolant inlet fitting adjacent the end of the elongate container opposite said first end wall for supplying the hot engine coolant into the hot engine coolant flow passage,
   said temperature sensing element of the temperature sensitive control being located in said passage means adjacent an end of the heat transfer wall remote from said first transverse end wall to sense fuel temperature after heating of the fuel is complete,
   and the container also having outlet means for discharging hot engine coolant from the flow passage adjacent said first end wall, and
   fuel outlet means adjacent the temperature sensing element to discharge the fuel after the temperature has been sensed.

2. The engine attachment according to claim 1 wherein the heat transfer wall is attached to and supported from one end of the annular side wall and is clamped thereon by the adjacent transverse end wall.

3. An engine attachment for heating gasoline with heat carried by a heat supplying fluid such as the engine coolant, comprising
   an elongate closed container defining an interior chamber and having a peripheral outer wall and an end wall,
   flow directing means within the interior chamber and defining an elongate annular fluid chamber adjoining and extending along the peripheral wall of the container and also defining an elongate central gasoline chamber extending along and disposed within the annular heating fluid chamber, said flow directing means including an elongate annular heat transfer wall between the annular heating fluid chamber and the central gasoline chamber to transfer heat from the heat supplying fluid to the gasoline,
   the elongate container having a first pair of exterior flow connections spaced from each other along the container and communicating with the annular heating fluid chamber for connecting to the supply of heating fluid and producing flow of the heating fluid through the annular heating fluid chamber in a first endwise direction,
   the container also having a second pair of exterior flow connections in spaced relation with each other and adjacent the end wall in flow communicating relation with the central gasoline chamber for circulating gasoline through the central chamber, and
   passage defining means within the central gasoline chamber and defining annular duct means adjoining and extending along the inner periphery of the annular heat transfer wall to facilitate supplying heat to the gasoline from the heat supplying fluid, the passage defining means also defining an expansion chamber inwardly of the duct means, said passage defining means including a heat insulating wall between the duct means and the expansion chamber to minimize heat transfer between the gasoline flowing in the duct means and in the expansion chamber, the duct means and expansion chamber respectively being in flow communication with the flow connections of said second pair of flow connections to produce flow of gasoline through the duct means in a direction opposite to the flow of heat supplying fluid in the annular heating fluid chamber.

4. The engine attachment according to claim 3 and said passage defining means also including a transverse heat insulating wall connected to and closing an end of the expansion chamber, the transverse heat insulating wall having a central opening to accommodate flow of the gasoline from the duct means into the expansion chamber.

5. The engine attachment according to claim 3 and said expansion chamber having upper and lower portions, one of the flow connections having an inlet in the lower portion of the expansion chamber for discharging gasoline therefrom.

6. The engine attachment according to claim 5 and an additional flow connection communicating with the expansion chamber at a location above said flow connection inlet therein, said additional flow connection having flow restricting means permitting escape of vapors from the expansion chamber.

7. The engine attachment according to claim 3 and including thermostatically controlled valve means in the interior chamber communicating with the annular heating fluid chamber and modulating flow of heating fluid therein in response to the temperature of the gasoline in the central gasoline chamber.

8. The engine attachment according to claim 7 wherein said valve means has a valve operating temperature sensing element extending into the central gasoline chamber, said passage defining means directing flow of gasoline over said temperature sensing element.

9. The engine attachment according to claim 8 and including a transverse wall across the end of the expansion chamber and adjacent an end of the duct means, said wall having heat insulating characteristics and having a central aperture adjacent said heat sensing element directing flow of gasoline from the duct means into the expansion chamber.

10. The engine attachment according to claim 7 and said elongate annular heat transfer wall having an outer periphery in closely spaced and confronting relation with the peripheral outer wall of the container, said heat transfer wall having a cylindrical mounting boss on one end thereof and in concentric relation to the outer periphery of the wall, a cup-shaped valve element with a cylindrical wall embracing said boss to slide therealong in close fitting relation, said valve element moving toward and away from a valve seat in the closed container to modulate flow of heating fluid through the annular heating fluid chamber.

11. The engine attachment according to claim 10 and including a spring means and a thermostatically sensitive operating means acting against said valve element in opposite directions and producing longitudinal movement of the valve element along the boss on the heat transfer wall, and the thermostatic sensitive operating means extending into the central gasoline chamber to sense the temperature of the flowing gasoline and to modulate the flow of heating fluid accordingly.

* * * * *